Jan. 16, 1962     D. RATCLIFF     3,016,649

DEVICE FOR RECOVERING FISH LURES AND THE LIKE

Filed April 15, 1959

INVENTOR
D. RATCLIFF

BY *A.Yates Dowell*
ATTORNEY

United States Patent Office 3,016,649
Patented Jan. 16, 1962

3,016,649
DEVICE FOR RECOVERING FISH LURES
AND THE LIKE
Daniel Ratcliff, Washington, N.C.
Filed Apr. 15, 1959, Ser. No. 806,576
2 Claims. (Cl. 43—17.2)

This invention relates to fishing and trapping, to the equipment employed in and in connection with such operations, and especially to fishing tackle accessories and the like used in various waters in an effort to catch fish.

The invention also relates to auxiliary equipment carried by the fisherman for meeting emergencies that may arise as well as for the convenience of the fisherman, in the use of the tackle including the changing of lures and other things including the preparation of the catch for the pan.

Exposed roots, logs, posts, and other snags abound in some locations to plague the fisherman by frequently causing the fishing lines to be caught, detached, and lost, and with some of such equipment being of substantial monetary value so that its loss sometimes mars the pleasure of fishing.

Devices of many kinds have been produced for freeing fishing lines, recovering lures and other equipment, but these have not been satisfactory due to the fact that they also have become entangled and lost or were unrecoverable. Therefore failing to accomplish the purpose for which they were designed, they increased the disappointment resulting from the failure to salvage the detached equipment.

It is an object of the invention to solve the problem above mentioned and to provide a device by which fish lures, bait and the like ordinarily can be freed when entangled upon a root, log or other projection concealed beneath the surface of the water.

Another object of the invention is to provide a simple and inexpensive device for freeing a fishing line and associated equipment when it becomes hung on a projection or snag beneath the water and which device will operate with minimum rotation likely to cause twisting.

A further object of the invention is to provide a line freeing device for use by fishermen and others and which can be readily applied to the line and by its weight caused to move non-rotatably down the line and free the latter from a snag or holding projection.

Figure 1:
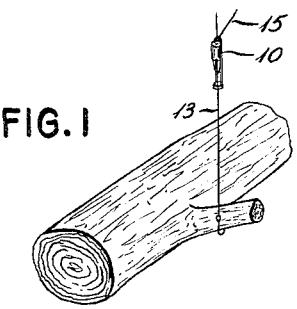
Figure 2:
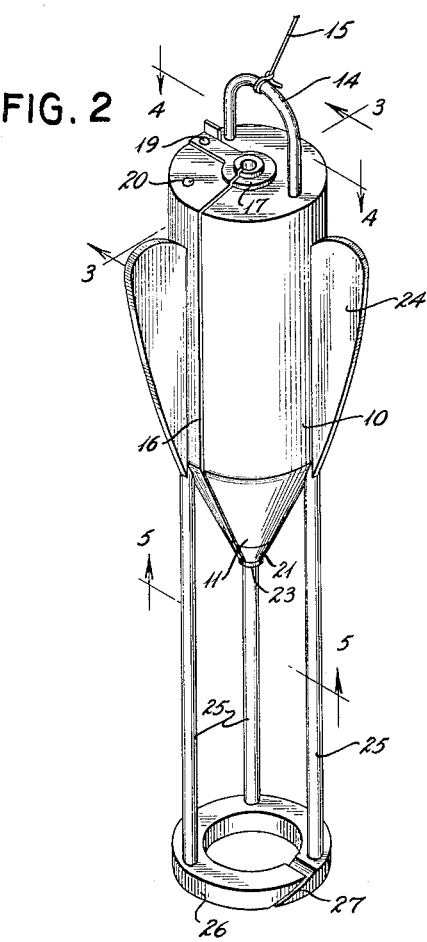
Figure 3:
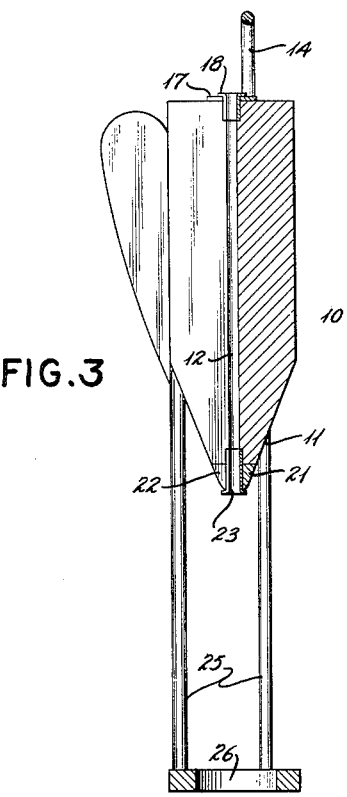
Figure 4:
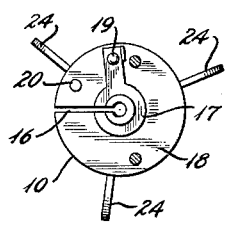
Figure 5:
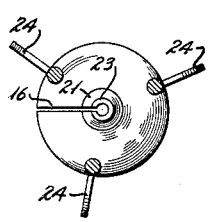

Other objects and advantages of the invention will be apparent from the following description taken in conjunction with the accompanying drawing, wherein:

FIG. 1 is a perspective illustrating the use of one application of the invention;
FIG. 2, an enlarged side elevation of the device itself; and
FIGS. 3, 4, and 5, sections respectively on the lines 3—3, 4—4, and 5—5 of FIG. 2.

Briefly stated, the invention is a device for recovering fish lures, baits and other equipment attached to a line which extends beneath the surface of the water and the device comprises a torpedo-like body to the large end of which a recovery line is adapted to be attached, such body having an axial bore and a slot extending through the wall of the body into the bore for insertion of a line the lower end of which it is designed to release, and with such torpedo-like body provided with a pivoted latch at each of its upper or blunt and lower or pointed ends for holding the line in the center of the bore, extension rods being spaced 120° apart around and attached to the lower end portion of the body and mounting a ring with an angular slot spaced from the slot in the torpedo-like body almost 120°, and such body also being provided with elongated fins extending along and radially outward of the body and serving to cause the device to travel substantially in a straight line and to resist rotation.

With continued reference to the drawing, the device for freeing fishing and other lines and for recovering fish lures, bait and other equipment comprises a torpedo-like lead cylinder 10 of appropriate size and length, a cylinder 1″ in diameter and 3″ in length having been used satisfactorily, such cylinder having a tapered portion 11 for approximately one-third of its length and having a bore 12 in which a fishing or other line 13 is adapted to be received.

The torpedo-like body has fixed thereto a supporting handle 14 to which is attached a recovery line 15 in order to apply the body 10 to a fishing line. Such body is provided with a slot 16 extending from end to end and with a latch at each end for securing the line in the bore 12. The latch at the large end of the body has a central substantially C-shaped portion 17 for the insertion of the line, the opening in which is aligned with the opening in the body in order to permit the line to be inserted and the C-shaped latch is rotated on a mounting bearing 18 until a socket or recess 19 on the under side of the handle rides over a protuberance or boss 20 at which time the opening in the latch will be out of alignment with the slot leading to the bore of the body.

At the small end of the body a similar latch is provided in the form of a rotary disk 21 having a slot 22 and such disk being mounted on a bearing 23 so it can be rotated to allow the line to be inserted into the bore 12 and the ring rotated so that the opening will not be in alignment with the opening into the interior of the disk.

The body is provided with elongated fins 24 spaced 120° apart and extending radially from the lead body and also is provided with extension rods 25 which mount a ring 26 in spaced relation to the small end of the body and with such ring provided with a slot 27 substantially 120° from the slot 16.

It will be apparent from the above that a very simple device is provided which may be applied to a line caught beneath the water and the device allowed to move down by gravity and release the lower end of the line.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. In a device for application to a fishing line for freeing a snagged hook, the combination of a relatively heavy torpedo-like body having spaced fins extending radially outwardly thereof for stabilizing it against rotation, and a tapered portion at one end, a support handle for attaching a recovery line at the opposite end of said body, said body having an axial bore and a slot along the length thereof in communication with said bore whereby a fishing line may be introduced into said bore, latching means mounted on the opposite ends of said body for maintaining said line in said bore, a plurality of spaced rods connected to the tapered end portion of said body and extending substantially axially therefrom within the periphery of said body, a ring mounted on said rods and in spaced relation to said body, said ring having an angular slot disposed substantially out of line with the slot in said body whereby a fishing line is receivable in said ring and in the axial bore of said body.

2. A device applicable to a fishing line for freeing a snagged hook comprising a relatively heavy torpedo-like body having radial anti-rotation fins extending outwardly therefrom and a tapered extremity, a handle at its opposite extremity for the attachment of a recovery line, said body having an axial bore and a slot along the length thereof leading to said bore for the introduction of a fishing line thereinto, latching means on the opposite ends of said body for maintaining said line in said bore, said latching means including a member rotatably retained on the end of said torpedo-like body adjacent said handle and having a central opening and a slot leading thereinto, said member being rotatable for locking a line in said central opening, spaced rods connecting the tapered end portion of said torpedo-like body and extending therefrom in general parallel relation to the axis of said body and with said rods located substantially within the periphery of said body, a ring mounted on said rods in spaced relation to said body, said ring having an angular slot offset from the slot in said body whereby when said device is applied to a fishing line such line will be received within said ring, in the axial bore of said body and in a position to move freely along said fishing line to free a snagged hook.

References Cited in the file of this patent
UNITED STATES PATENTS

| | | |
|---|---|---|
| 2,479,448 | Woock | Aug. 16, 1949 |
| 2,526,031 | Kocarek | Oct. 17, 1950 |
| 2,809,460 | Taylor | Oct. 15, 1957 |
| 2,826,851 | Borgogno | Mar. 18, 1958 |